(12) United States Patent
Pihur et al.

(10) Patent No.: US 11,816,115 B2
(45) Date of Patent: Nov. 14, 2023

(54) SEARCH QUERY MODIFICATION DATABASE

(71) Applicants: Vasyl Pihur, Kirkland, CA (US); Senthil Sundaram, Mountain View, CA (US)

(72) Inventors: Vasyl Pihur, Kirkland, CA (US); Senthil Sundaram, Mountain View, CA (US)

(73) Assignee: Snap Inc., Santa Monica, CA (US)

( * ) Notice: Subject to any disclaimer, the term of this patent is extended or adjusted under 35 U.S.C. 154(b) by 262 days.

(21) Appl. No.: 17/217,400

(22) Filed: Mar. 30, 2021

(65) Prior Publication Data
US 2022/0318244 A1    Oct. 6, 2022

(51) Int. Cl.
*G06F 16/2458* (2019.01)
*G06F 16/36* (2019.01)
*G06F 16/2452* (2019.01)

(52) U.S. Cl.
CPC ...... *G06F 16/2462* (2019.01); *G06F 16/2452* (2019.01); *G06F 16/374* (2019.01)

(58) Field of Classification Search
CPC . G06F 16/2462; G06F 16/2452; G06F 16/374
See application file for complete search history.

(56) References Cited

U.S. PATENT DOCUMENTS

| | | | |
|---|---|---|---|
| 6,952,756 B1 * | 10/2005 | Le | G06F 9/3842 |
| | | | 365/219 |
| 9,098,569 B1 | 8/2015 | Bhagat | |
| 9,824,147 B1 | 11/2017 | Gilliland et al. | |
| 11,106,690 B1 | 8/2021 | Dhillon et al. | |
| 11,546,437 B1 * | 1/2023 | Bhushan | H04L 63/1416 |
| 2004/0254920 A1 * | 12/2004 | Brill | G06F 16/9535 |
| 2005/0210017 A1 * | 9/2005 | Cucerzan | G06F 16/9532 |
| 2008/0077563 A1 * | 3/2008 | Parikh | G06F 16/3322 |
| 2008/0228750 A1 * | 9/2008 | Zaragoza | G06F 16/338 |
| | | | 707/999.005 |

(Continued)

OTHER PUBLICATIONS

Milad Shokouhi SIGIR '13: Proceedings of the 36th international ACM SIGIR conference on Research and development in information retrieval Jul. 2013, pp. 103-112 https://doi.org/10.1145/2484028.2484076 (Year: 2013).*

(Continued)

*Primary Examiner* — Mark D Featherstone
*Assistant Examiner* — Kweku William Halm
(74) *Attorney, Agent, or Firm* — Culhane Meadows PLLC; Stephen J. Weed

(57) ABSTRACT

Systems, devices, media, and methods are presented for assembling a database for query generation. The database is assembled by receiving a query history log, the query history log including target queries and a mapping between each of the target queries and associated subqueries for each of the target queries, selecting one or more of the associated subqueries for a first target query based on a conditional probability exceeding a threshold for the associated subqueries of the first target query compared to the matching associated subqueries of the other target queries, and including the first target query and the selected one or more associated subqueries for the first target query in the in-memory data structure store for query generation.

20 Claims, 12 Drawing Sheets

(56) References Cited

U.S. PATENT DOCUMENTS

| | | | | |
|---|---|---|---|---|
| 2009/0132235 | A1* | 5/2009 | Liu | G06F 40/45 |
| | | | | 704/4 |
| 2010/0179948 | A1* | 7/2010 | Xie | G06F 16/951 |
| | | | | 707/706 |
| 2011/0295824 | A1 | 12/2011 | Schneider | |
| 2013/0339380 | A1* | 12/2013 | Meschkat | G06F 16/951 |
| | | | | 707/767 |
| 2016/0179807 | A1 | 6/2016 | Kumar et al. | |
| 2016/0196303 | A1* | 7/2016 | Okajima | G06F 16/90344 |
| | | | | 707/706 |
| 2019/0163768 | A1 | 5/2019 | Gulati et al. | |
| 2019/0171740 | A1 | 6/2019 | Sabripour et al. | |
| 2019/0251088 | A1 | 8/2019 | Ota et al. | |
| 2019/0251125 | A1 | 8/2019 | Song et al. | |
| 2019/0361870 | A1* | 11/2019 | Lai | G06F 16/2365 |
| 2020/0134144 | A1* | 4/2020 | Depaolo | G06F 9/54 |
| 2022/0172040 | A1 | 6/2022 | Kazi et al. | |

OTHER PUBLICATIONS

Liangda Li, Hongbo Deng, Anlei Dong, Yi Chang, Ricardo Baeza-Yates, WWW '17: Proceedings of the 26th International Conference on World Wide Web Apr. 2017, pp. 539-548 https://doi.org/10.1145/3038912.3052593 (Year: 2017).*

Altarawneh, Rasha :"Spelling Detection Errors Techniques in NLP: A Survey." International Journal of Computer Applications vol. 172, No. 4 (Aug. 2017), pp. 1-5. https://doi.org/10.5120/ijca2017915176.

Amati, Giambattista et al.: Query Difficulty, Robustness, and Selective Application of Query Expansion:. In Advances in Information Retrieval, Sharon McDonald and John Tait (Eds.). Springer Berlin Heidelberg, Berlin, Heidelberg, Apr. 2004; pp. 127-137.

Bawab, Ziad Al et al.: "Finding trending local topics in search queries for personalization of a recommendation system". In KDD, Aug. 12-16, 2012, Beijing, China, pp. 397-405.

Carlson, Josiah L.: "Redis in Action". Manning Publications Co., 2013, USA, 322 pages.

Erlingsson, Úlfar et al.: "RAPPOR: Randomized Aggregatable Privacy-Preserving Ordinal Response". In Proceedings of the 2014 ACM SIGSAC Conference on Computer and Communications Security (Scottsdale, Arizona, USA) (CCS 14). Association for Computing Machinery, 2014, New York, NY, USA, pp. 1054-1067. https://doi.org/10.1145/2660267.2660348.

Gog, Simon et al.: "Efficient and Effective Query Auto-Completion". In Proceedings of the 43rd International ACM SIGIR Conference on Research and Development in Information Retrieval (Virtual Event, China) (SIGIR '20). Association for Computing Machinery, New York, NY, USA, Jun. 10, 2020, pp. 2271-2280. https://doi.org/10.1145/3397271.3401432.

Gormley, Clinton et al.: "Elasticsearch: The Definitive Guide" (1st ed.). O'Reilly Media, Inc., USA, Jan. 2015, 719 pages.

Hirsch, Sharon et al.: "Query Reformulation in E-Commerce Search". In Proceedings of the 43rd International ACM SIGIR Conference on Research and Development in Information Retrieval (Virtual Event, China) (SIGIR '20). Association for Computing Machinery, Jul. 25, 2020, New York, NY, USA, pp. 1319-1328. https://doi.org/10.1145/3397271.3401065.

Hudson, R. et al.: "Software without Frontiers: A Multi-Platform, Multi-Cultural, Multi-National Approach" (1st ed.). John Wiley & Sons, Inc., 1997, USA, 2 pages.

Lugo, Luis et al.: "Segmenting Search Query Logs by Learning to Detect Search Task Boundaries". In Proceedings of the 43rd International ACM SIGIR Conference on Research and Development in Information Retrieval (Virtual Event, China) (SIGIR '20). Association for Computing Machinery, Jul. 2020, New York, NY, USA, pp. 2037-2040. https://doi.org/10.1145/3397271.3401257.

Manning, Christopher D. et al.: "Foundations of Statistical Natural Language Processing". 1999, The MIT Press, Cambridge, MA, USA. 3 pages.

Palin, Kseniia et al.: "How do People Type on Mobile Devices?: Observations from a Study with 37,000 Volunteers". Presented in 21st International Conference on Human-Computer Interaction with Mobile Devices and Services, Oct. 1-4, 2019, Taipei, Taiwan, 13 pages. https://doi.org/10.1145/3338286.3340120.

Qian, Xueming et al.: "Personalized Recommendation Combining User Interest and Social Circle". IEEE Transactions on Knowledge and Data Engineering vol. 26, No. 7 (Jul. 2014), pp. 1763-1777. https://doi.org/10.1109/TKDE.2013.168.

Singhal, Amit: "Modern Information Retrieval: A Brief Overview". IEEE Data Eng. Bull. vol. 24, No. 4 (2001), pp. 35-43. http://dblp.uni-trier.de/db/journals/debu/debu24.html#/Singhal01.

Yao, Jing et al.: "Employing Personal Word Embeddings for Personalized Search". In Proceedings of the 43rd International ACM SIGIR Conference on Research and Development in Information Retrieval (Virtual Event, China) (SIGIR '20). Association for Computing Machinery, 2020, New York, NY, USA, pp. 1359-1368. https://doi.org/10.1145/3397271.3401153.

Zhong, Jianling et al.: "Personalized Query Suggestions". In Proceedings of the 43rd International ACM SIGIR Conference on Research and Development in Information Retrieval (Virtual Event, China) (SIGIR '20). Association for Computing Machinery, Jul. 25, 2020; New York, NY, USA, 1645-1648. https://doi.org/10.1145/3397271.3401331.

* cited by examiner

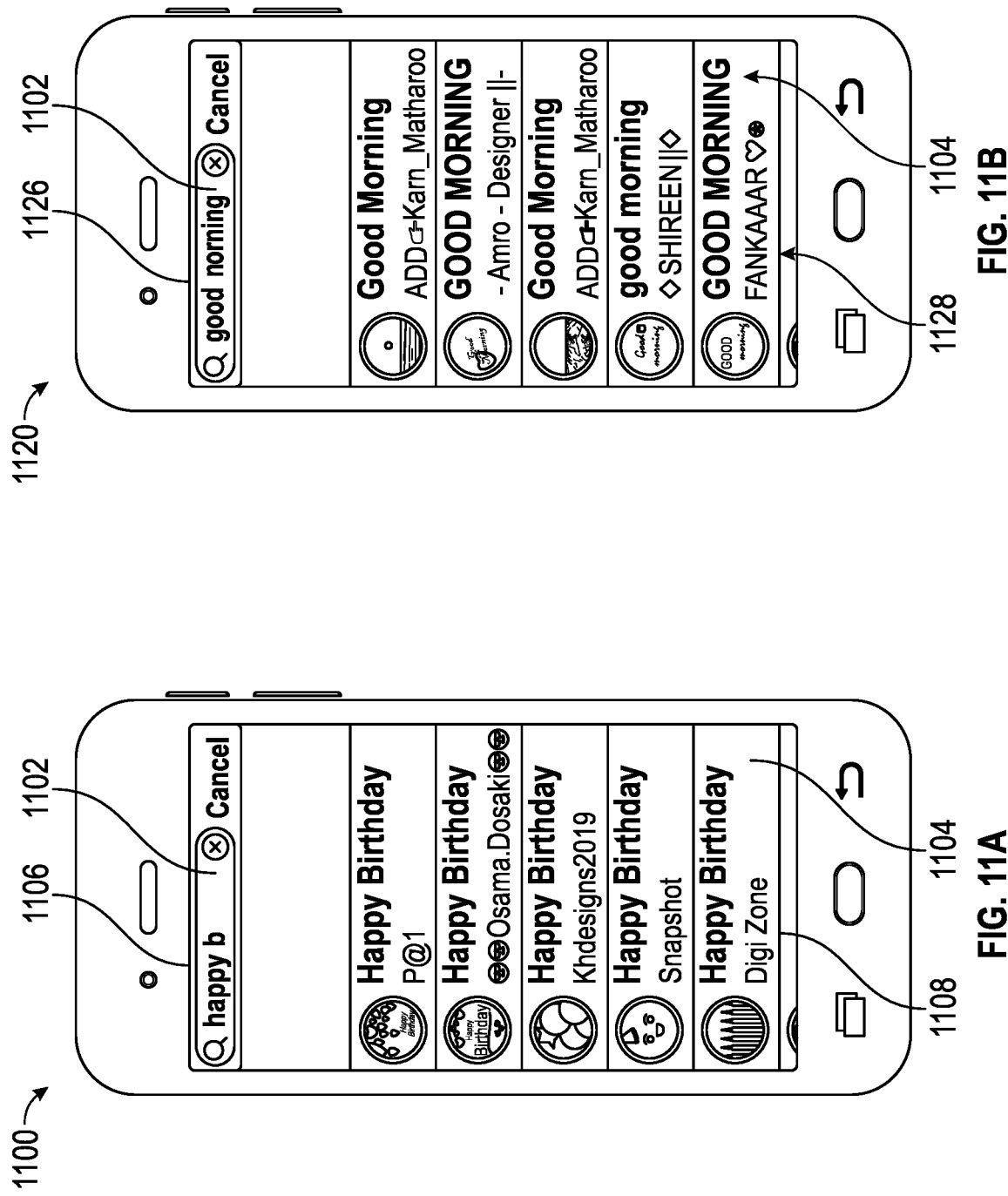

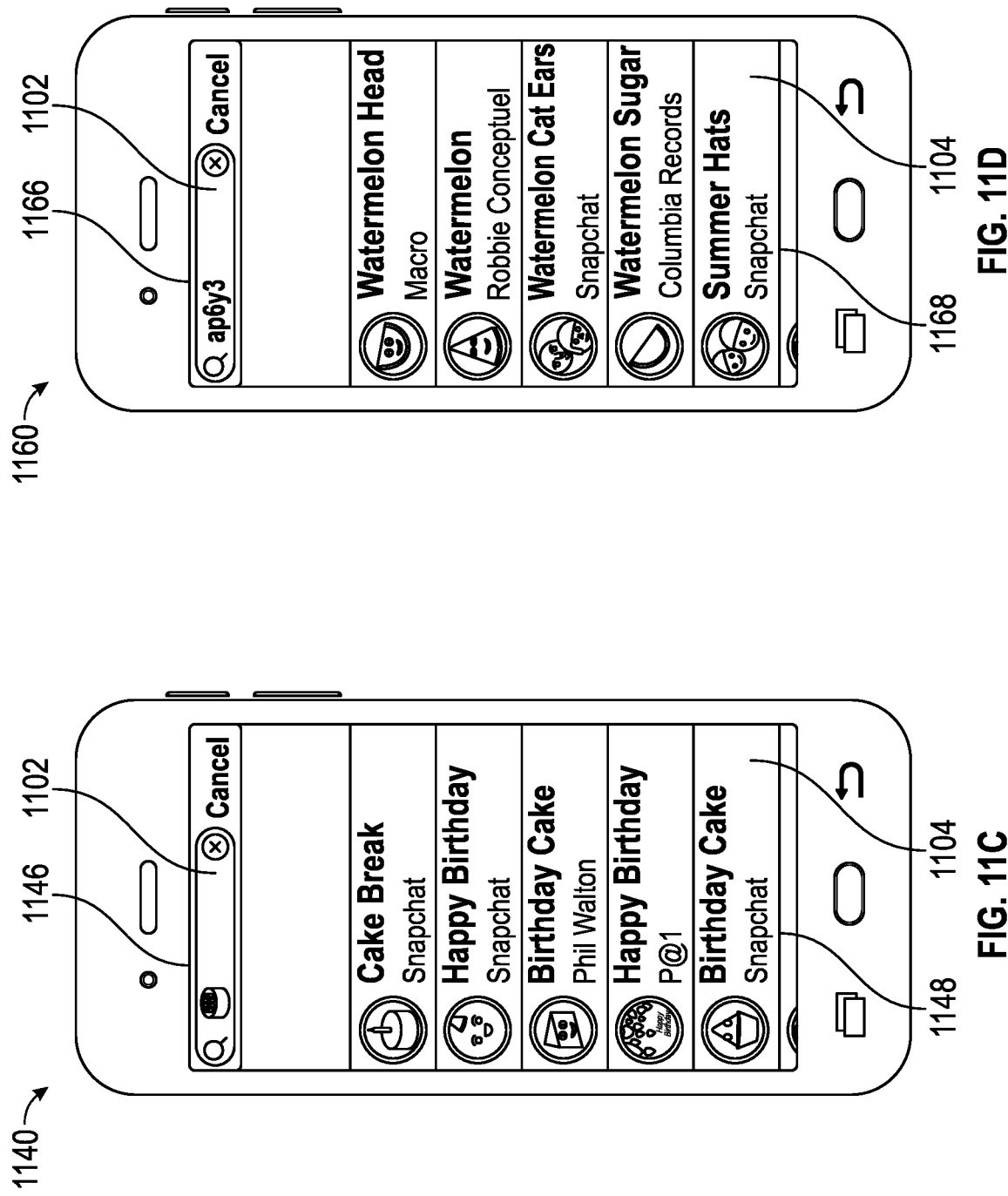

SEARCH QUERY MODIFICATION DATABASE

TECHNICAL FIELD

Examples set forth in the present disclosure relate generally to content searching. More particularly, but not by way of limitation, the present disclosure addresses systems and methods for assembly a database for use in modifying (augmenting or adjusting) queries for retrieving desired content.

BACKGROUND

Content providers utilize search engines to enable their users to search for the content they desire. To retrieve desired content, a user supplies a conventional search engine with one or more terms that the search engine then compares to keywords (tags) associated with content or to words within the content itself. Upon identifying one or more matches, the search engine returns the matching content to the user.

BRIEF DESCRIPTION OF THE DRAWINGS

The disclosed subject matter is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. To easily identify the discussion of any particular element or act, the most significant digit or digits in a reference number refer to the figure number in which that element is first introduced. This emphasizes that according to common practice, the various features of the drawings are not drawn to scale unless otherwise indicated. On the contrary, the dimensions of the various features may be expanded or reduced for clarity. Included in the drawings are the following figures:

FIGS. 11A, 11B, 11C, and 11D are graphical user interfaces (GUIs) illustrating automatic search completions, spell corrections, expansion, and translations, respectively.

DETAILED DESCRIPTION

Figure 1:
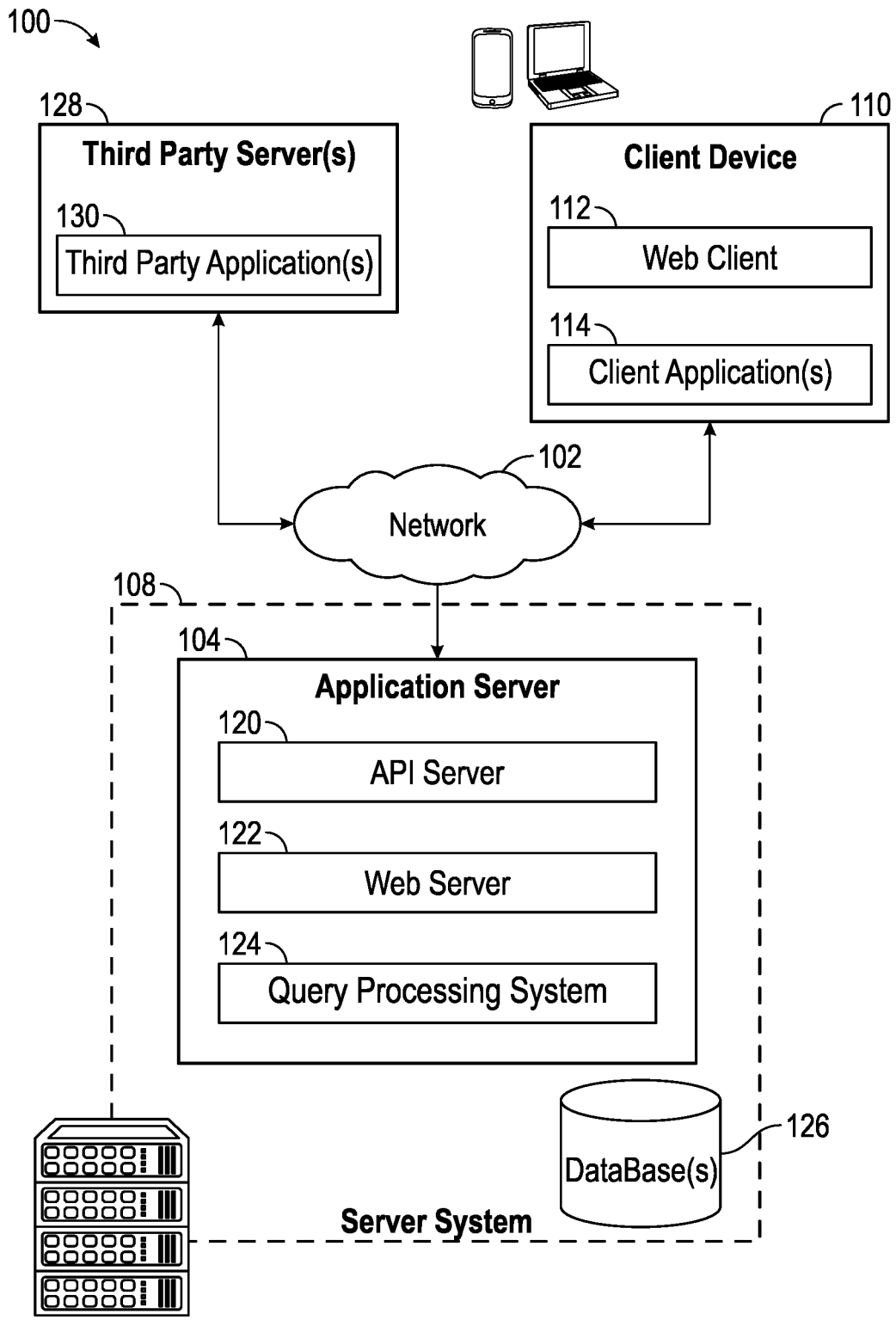
FIG. 1 is a block diagram of an example query processing system in an online client-server system.

Examples described herein are directed to assembly a database for use in modifying (augmenting or adjusting) queries for retrieving desired content. Modifying queries prior to searching using such a database provide more intuitive query results during entry of a target query. Processing of logs including prior queries yields a query processing layer data (QPL) database including target queries and relevant subqueries (letter/symbol combinations entered during generation of the target queries). The QPL database structure operates in a query processing layer (QPL) positioned between the text entry field of user device and a search engine. Subsequent subqueries are compared to the relevant subqueries in the QPL database and identification of a matching relevant subquery results in the associated target query sent for searching (instead of or in addition to the associated subquery). Additionally, the QPL database may correct spelling and supplement emoji subqueries with relevant text (also referred to as emoji understanding).

As used herein, a target query refers to the complete word, phrase, symbol(s), or combination thereof that a user intends to enter for searching (e.g., heart). As used herein, a subquery refers to strings of one or more letters/symbols the user actually enters in the process of entering a desired target query (e.g., for target query "heart," subqueries may be "h," "he," "hea," "hear," and "heart"). Additionally, mistakes (e.g., "heat") may form part of the subquery if a user enters makes a mistake during the query entry process.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

In accordance with one example, a method is provided for assembling a database for query generation. The method includes receiving a query history log, the query history log including target queries and a mapping between each of the target queries and associated subqueries for each of the target queries, selecting one or more of the associated subqueries for a first target query based on a conditional probability exceeding a threshold for the associated subqueries of the first target query compared to the matching associated subqueries of the other target queries, and including the first target query and the selected one or more associated subqueries for the first target query in the in-memory data structure store for query generation.

In accordance with another example, a system is provided for assembling a database for query generation. The system includes a receiving port, a selection engine, and a generation engine. The receiving port is configured to receive a query history log, the query history log including target queries and a mapping between each of the target queries and associated subqueries for each of the target queries. The selection engine is configured to select one or more of the associated subqueries for a first target query based on a conditional probability exceeding a threshold for the associated subqueries of the first target query compared to the matching associated subqueries of the other target queries. The generation engine is configured to include the first target query and the selected one or more associated subqueries for the first target query in the in-memory data structure store for query generation.

In accordance with another example, a non-transitory processor-readable storage medium is provided for assembling a database that stores processor-executable instructions that, when executed by a processor of a machine, cause the machine to perform operations. The operations performed by the machine include receiving a query history log, the query history log including target queries and a mapping between each of the target queries and associated subqueries for each of the target queries, selecting one or more of the associated subqueries for a first target query based on a conditional probability exceeding a threshold for the associated subqueries of the first target query compared to the matching associated subqueries of the other target queries, and including the first target query and the selected one or more associated subqueries for the first target query in a database for query generation.

Examples described herein are useful for addressing one or more of the challenges faced by existing searching techniques. One challenge is providing search results for mobile-first platforms (e.g., platforms where most users engage with an application on a mobile device using a keyboard presented on a relatively small device screen (e.g., less than 10 inches by 5 inches). Typing on a mobile keyboard is tiring and error-prone and the inventors have discovered that the frequency and variation in typing errors identified in the data is substantial.

A second challenge is addressing short queries where, for example, users, on average, make a selection after just over 4 keystroke actions. Traditional natural language processing (NLP) query understanding and complex semantic analyses yield little benefit under these conditions.

A third challenge is localization where the content is, for example, visual in nature. Such content transcends linguistic and social borders and is, for the most part, globally understood and appreciated. But it is unlikely that someone searching in Spanish will be able to find a dancing hotdog image/overlay that is tagged in English, unless its tagging keywords ("hotdog", "dancing", etc.) are explicitly translated into Spanish and included in the index of the image/overlay, which is expensive, time-consuming, and inefficient.

A fourth challenge is visually searching for visual content. For example, searching using emojis (e.g., using an emoji keyboard) is convenient and takes only one character. Traditional search engines, however, are unable to provide content tagged with a term such as the text "camel" using an emoji for a "camel" character unless the emoji is also included in the index of the content.

FIG. 1 is a block diagram illustrating a system 100, according to some examples, configured to automatically process query logs (including target queries and the associated subqueries entered during the development of target queries) to create a QPL database for modifying subsequent subqueries in order to provide more intuitive query results during entry of the subqueries. The system 100 includes one or more client devices such as client device 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform.

For example, client device 110 is a device of a user who is searching for content maintained by an online social platform. Client device 110 accesses a website on the social platform (e.g., hosted by server system 108) directly or through one or more third party servers 128 (e.g., utilizing one or more third-party applications 130). Application server 104 records target queries and the associated subqueries received from a client device 110 in database 126. The application server 104 produces a QPL database (e.g., an in-memory database) by analyzing the target queries and associated subqueries using techniques disclosed herein for use in modifying future subqueries to provide more intuitive search results as a query is being entered.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online home buying and selling application, a real estate application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, provide search results, etc.). Conversely, one or more client application(s) 114 may not be included in the client device 110, and then the client device 110 may use its web browser to access the one or more third party applications 130 hosted on other entities in the system 100 (e.g., third-party server(s) 128, server system 108, etc.).

A server system 108 provides server-side functionality via the network 104 (e.g., the Internet or wide area network (WAN)) to one or more third party server(s) 128 and one or more client devices 110. The server system 108 includes an application program interface (API) server 120, a web server 122, and a query processing system 124, that may be communicatively coupled with one or more database(s) 126. The one or more database(s) 126 may be storage devices that store data (e.g., in a dataset) related to users of the server system 108, applications associated with the server system 108, cloud services, housing market data, and so forth. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application. In one example, the server system 108 includes a query processing system 124. The query processing system 124 may include one or more servers and may be associated with a cloud-based application(s). The query processing system 124 may receive search queries and user information (e.g., user ID and session ID), store the received queries and information in the database 126, process the queries and information to create a QPL database, and access the QPL database to provide more intuitive search results during subsequent query entries. The details of the query processing system 124 are provided below in connection with FIGS. 2A, 2B, and 2C.

The system 100 further includes one or more third party server(s) 128. The one or more third-party server(s) 128 may include one or more third-party application(s) 130. The one or more third-party application(s) 130, executing on third party server(s) 128 may interact with the server system 108 via API server 120 via a programmatic interface provided by the API server 120. For example, one or more of the third-party applications 132 may request and utilize information from the server system 108 via the API server 120 to support one or more features or functions on a website hosted by the third party or an application hosted by the third party. The third-party application(s) 130, for example, may provide search functionality and software version analysis functionality that is supported by relevant functionality and data in the server system 108.

Figure 2A:
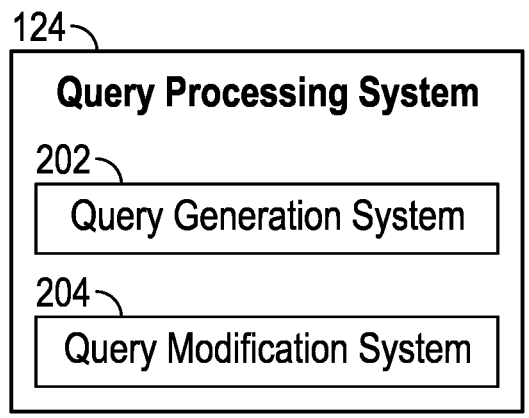
FIG. 2A is a block diagram illustrating an example query processing system.

FIG. 2A is a block diagram illustrating an example query processing system 124. The illustrated query processing system 124 includes a query generation system 202 and a query modification system 204. The query generation system 202 is an offline component that processes query logs of past queries (e.g., the last seven days) to develop a QPL database including target queries and associated subqueries. The query modification system 204 is an online component that compares a current query being entered by a user in a search field of their device to subqueries in the QPL database to identify a match and modifies the current query to include the associated target query (either by replacing or supplementing the current query) when a match is identified. It will be understood by one of skill in the art that the query generation system 202 and the query modification system 204 may operate in conjunction with one another or may be separate systems.

Figure 2B:
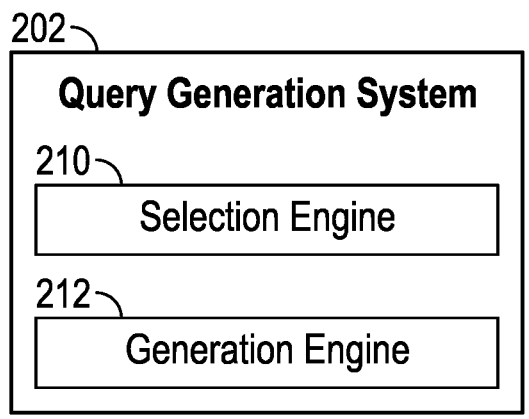
FIG. 2B is a block diagram illustrating an example query generation system.

As shown in FIG. 2B, the query generation system 202 includes a selection engine 210 and a generation engine 212. The selection engine 210 implements instructions to select desirable subqueries associated with each target query for inclusion in the QPL database. The generation engine 212 builds the QPL database from the target queries and selected subqueries. It will be understood by one of skill in the art that the selection engine 210 and the generation engine 212 may operate in conjunction with one another or may be separate systems.

Figure 2C:
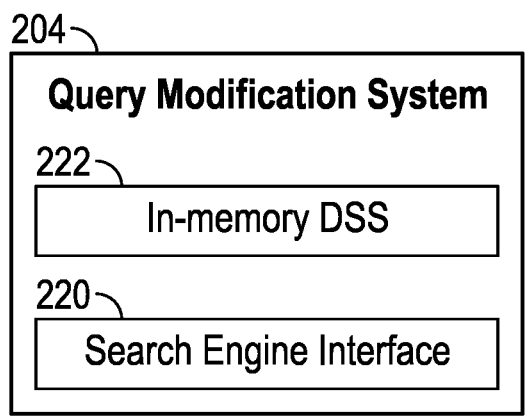
FIG. 2C is a block diagram illustrating an example query modification system.

As shown in FIG. 2C, the query modification system 204 includes a search engine interface 220 and a QPL database 222 (e.g., an in-memory database that resides in a memory of the server system). The search engine interface 220 provides an interface to a search engine (e.g., using an API available from the search engine) through which queries are sent and responses to the queries are received. The QPL database 222 stores the target queries and selected subqueries (e.g., in database 126) for use in processing a subquery received from a user device 110. It will be understood by one of skill in the art that the search engine interface 220 and the QPL database 222 may operate in conjunction with one another or may be separate systems.

Figure 3:
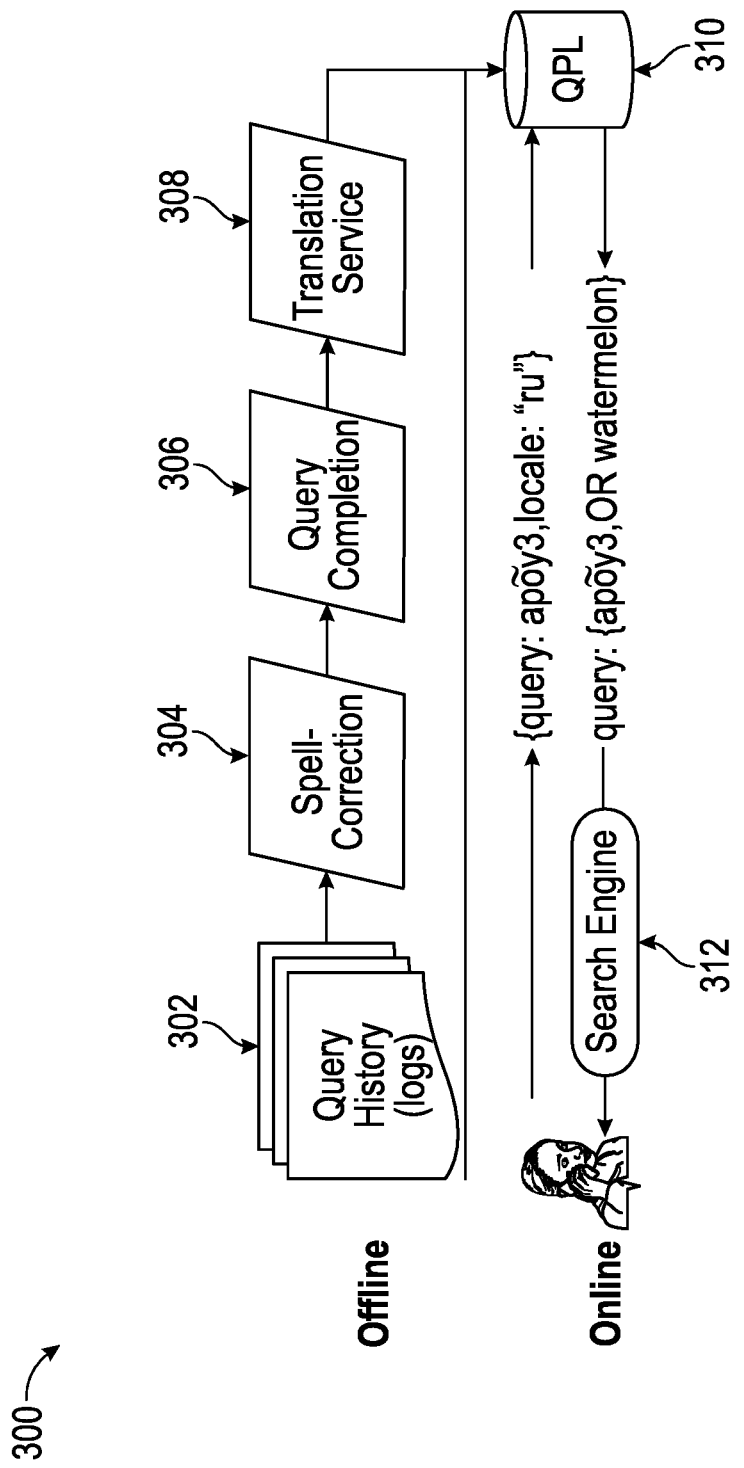
FIG. 3 is a diagram depicting an example offline query processing layer (QPL) database generation and online QPL database use.

FIG. 3 is a diagram depicting example offline QPL database generation and online QPL database use. At block 302, query history logs are assembled and stored (e.g., in database 126). The query history logs include target queries and associated subqueries from actual queries (e.g., by a social media app user for content maintained by a social media provider). The query history logs may include logs that are for a predefined recent period of time (e.g., a rolling seven day period) so the query history logs remain current.

At block 304, spell correction occurs. In an example, the spelling of target queries are checked and corrected using a dictionary (and associated correction mappings) developed from the query history logs using techniques described herein. The spelling of subqueries may not be checked or corrected as the subqueries represent actual entries of users, which may contain common misspellings and typos useful in selecting intended target entries for others that make those same mistakes.

At block 306, query completion occurs. Query completion includes associating text corresponding to a symbol with target queries containing that symbol (e.g., by looking in a database including a list of symbols and associated text stored in database 126) and vice versa, associating text or symbols corresponding with related text or symbols in a query (e.g., "heart" associated with "love" in a database including a list of associated terms/symbols stored in the database 126), or a combination thereof.

At block 308, translation occurs. Translation includes associating a translation (e.g., in English) corresponding to a target query containing corresponding foreign language text (e.g., by looking in a database including a list foreign language text and associated English text stored in database 126). In an example, the database for translation is developed by sending a foreign language target query (e.g., identified based on locale provided by the client device 110 or determined by the server system 108) to a translation engine (e.g., Google Translate available from Google of Mountain View, Calif., USA). If an English translation is returned, the English translation is associated with the corresponding foreign target query (e.g., a mapping in the database 126). Although an implementation with English as a base language is described, one of skill in the art will understand how to apply the teachings herein to different base languages.

In one example, a Russian user (location ID—"ru") enters the term "арôу3 (which is the Russian word for watermelon) in a search field of a client application running on their client device. After each character entry, the client application sends the current string of characters (along with the user ID, session ID, and locale) as a search query to an application server for the client application, which routes the string of characters and locale to the query processing system 124 in the query processing layer 310. The QPL 310 identifies a match for арôу3 (i.e., watermelon) and modifies the search query to additionally include the translated term.

QPL 310 receives the target queries and subqueries (along with associated corrections, completions, and translations) developed from the query history for future online queries from users. The modified search is sent by the QPL 310 to the search engine 312. The search engine 312 identifies results based on the modified search query and the results are returned to the user via the application server and client server for display on the client device.

A suitable search engine 312 is Elasticsearch (ES; available from Elastic NV of Mountain View, Calif., USA), which may be queried in real-time for user search terms. For example, when a user types "black and white", this query is modified as described herein and sent to ES and a list of matching documents with corresponding BM25 or TF-IDF scores is returned (in some cases LTR ranking are applied). Each document has a series of "tags" or "words" associated with it which, depending on the particular application, are either manually generated tags or any free-form text associated with the document (such as names, etc.).

Figure 4:
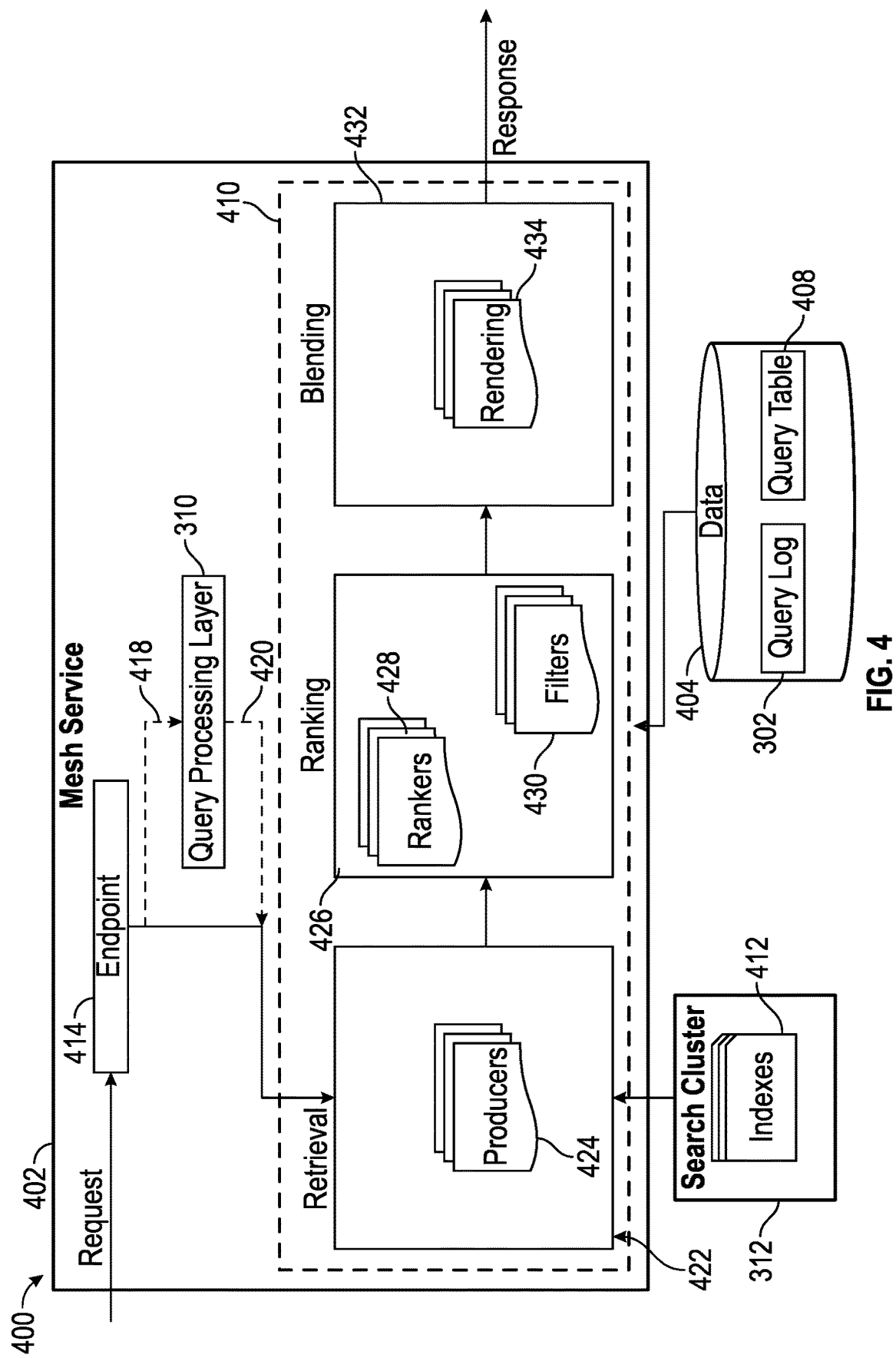
FIG. 4 is a diagram of an example query system with a query processing layer.

FIG. 4 depicts an example query system 400 with a QPL 310 implemented as a mesh service 402. An endpoint 414 of the application server 104 receives the search query (i.e., request). The application server 104 routes the search query to the QPL 310 for modification, if applicable. The application server 104 then routes the search query (as modified, if applicable) a search retrieval and result assembly system 410. A retrieval engine 422 retrieves search result for content producers 424 (e.g., via a search engine 312 such as Elasticsearch), where different producers 424 (e.g., different content delivery aspects of an application, e.g., overlays, messaging, content development, etc.) get different documents. The search engine 312 selects the results from an indexed documents 412. A ranking engine 426 then ranks the results according to ranking rules 428 and filters 430 (e.g., by applying machine learning). A blending engine 432 puts the results together according to rendering rules 434 and the rendered results are sent to the user. The mesh service 402 has access to a database 404 including query logs 302 that store historical queries for processing to build a query table 408 for current query modification.

Figure 5:
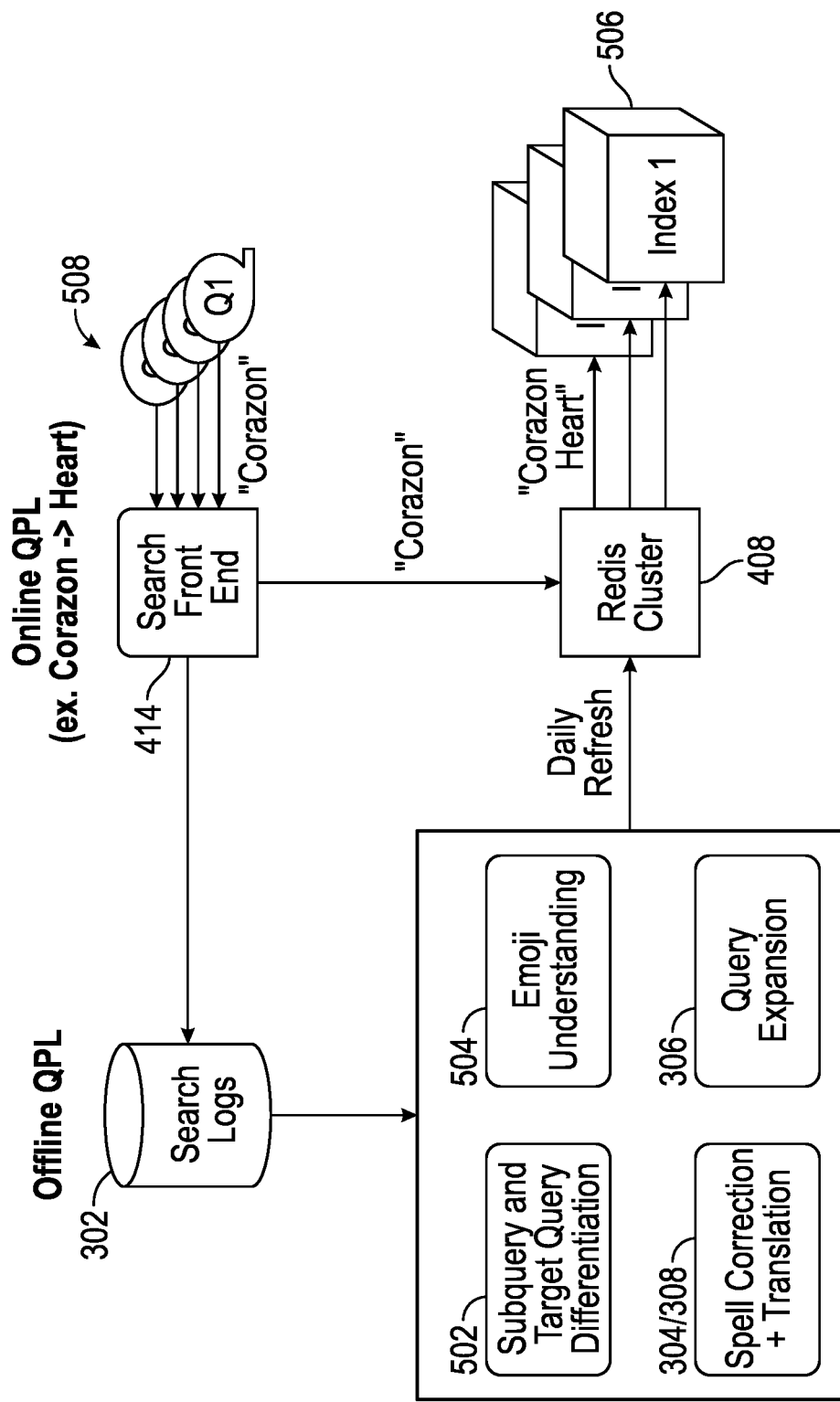
FIG. 5 is a diagram of an example query generation system and query modification system.

FIG. 5 depicts an example query generation system and query modification system useful for illustrating process flow. Queries 508 to a search front end 412 are stored in the search logs 302. Modules process the queries in the search logs 302. The spell correction and translation module 304/308 corrects spelling errors in the target queries and translates foreign language target queries to a base native language (e.g., English). The query expansion module 306 associates text corresponding to a symbol in a query with target queries containing that symbol and associates text or symbols related to the text or symbols in the query. A subquery and target query differentiation module 502 identifies target queries (e.g., the longest string of characters during a search session) and subqueries associated with those target queries. The emoji understanding engine 504 includes text associated with each of one or more symbols (e.g., for use by the query expansion module 306).

The processed queries are added to a remote dictionary server 408 (e.g., an in-memory database such as a redis cluster available from Redis Labs of Mountain View, Calif., USA). The remote dictionary server 408 stores the processed queries in indexes 506 (e.g., in database 126). In an example, the processed queries are periodically refreshed (e.g., daily).

In use, a query 508 (e.g., "Corazon") is sent by the search front end 414 to the remote dictionary server 408 in addition to being logged in the search logs 302 for processing in order that future queries may benefit from the current search. The remote dictionary server 408 scans the indexes 506 for a match. If a matching term/symbol is found (e.g., the English language "Heart" corresponding to "Corazon"), the query is modified to include the matching term/symbol prior to sending the query to a search engine 312 (FIG. 3) for processing.

Figure 6:
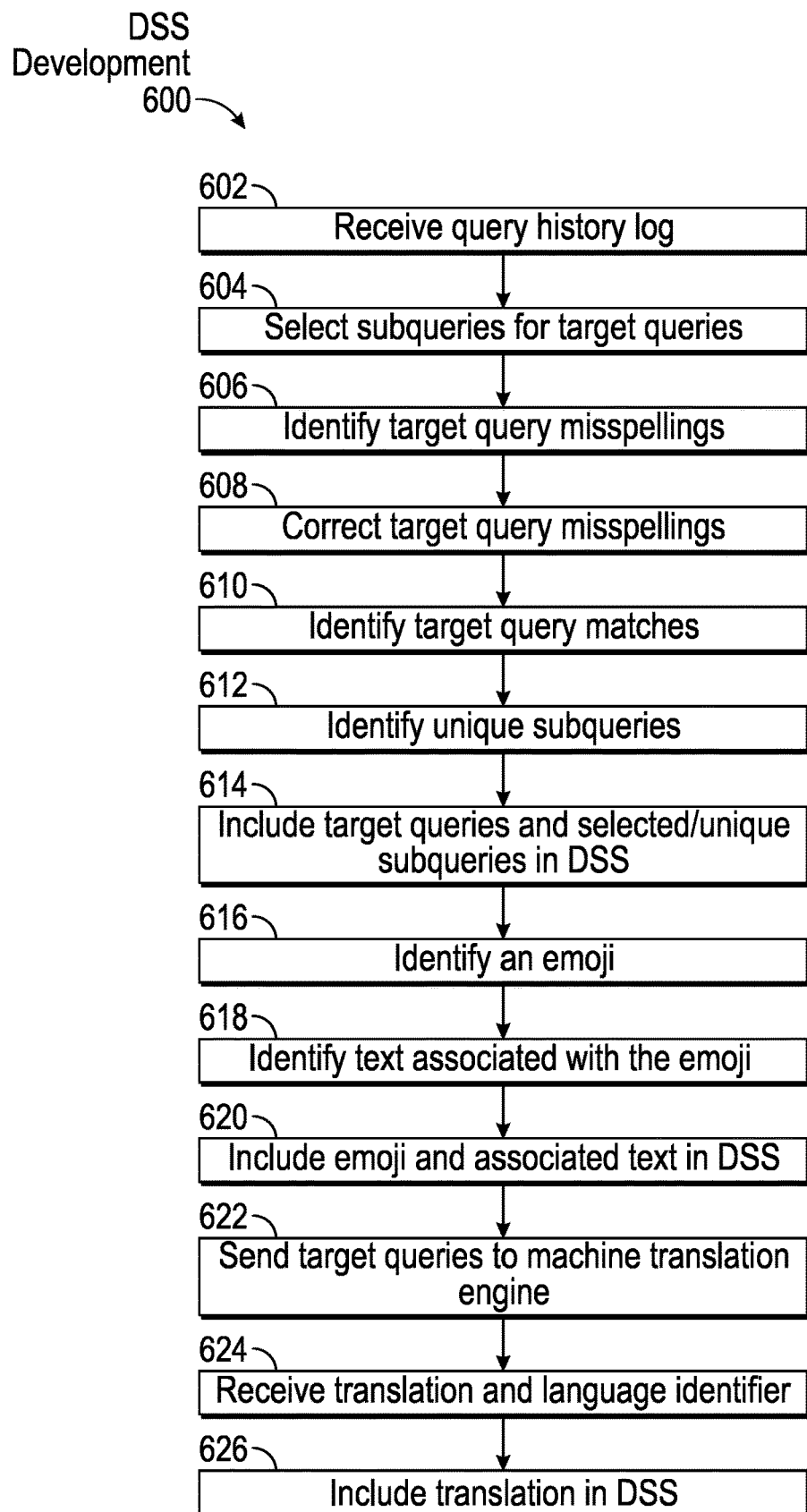
FIGS. 6, 7, and 8 are flow charts illustrating example methods for query database generation, dictionary generation, and query modification, respectively.
Figure 7:
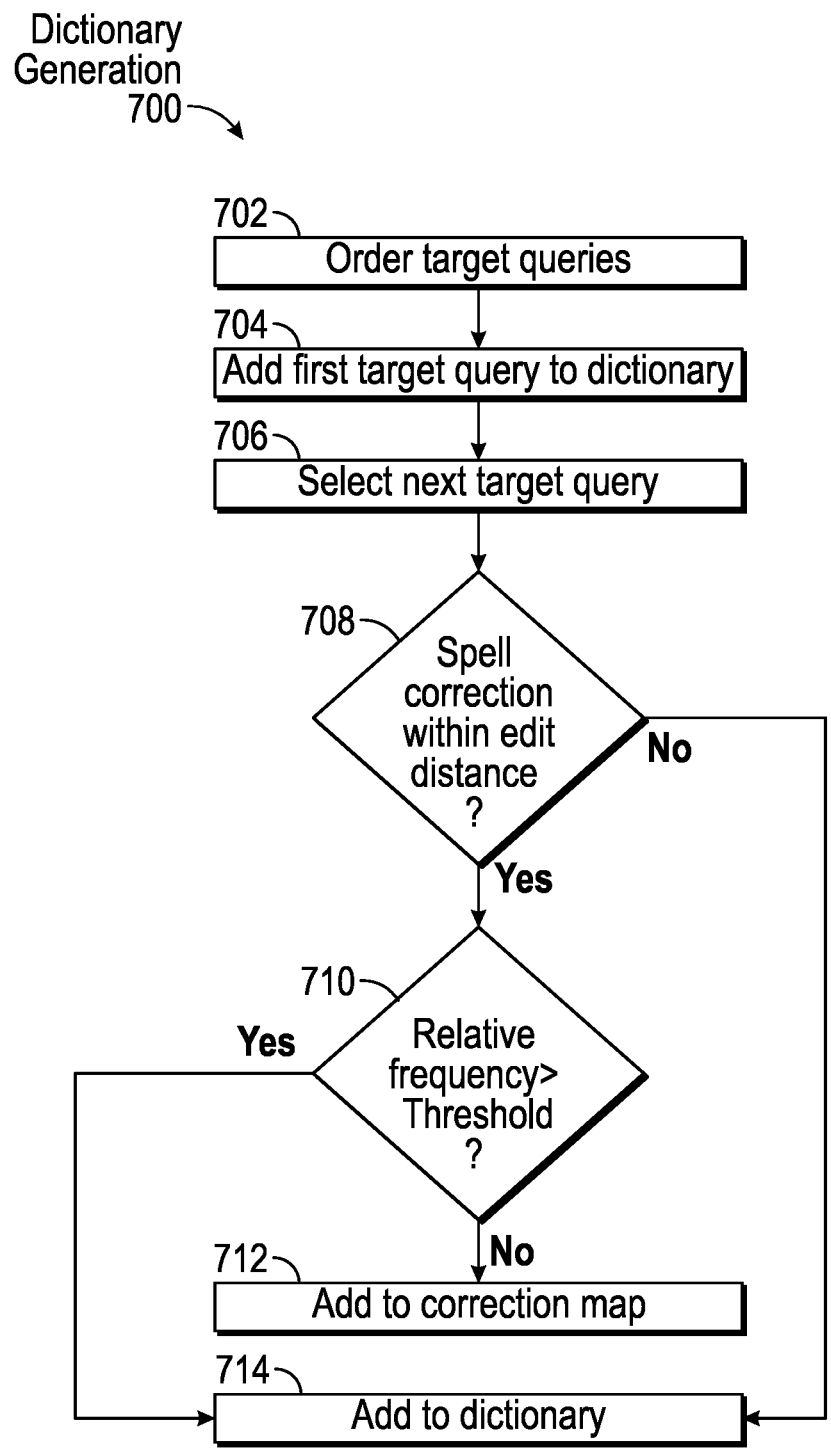
Figure 8:
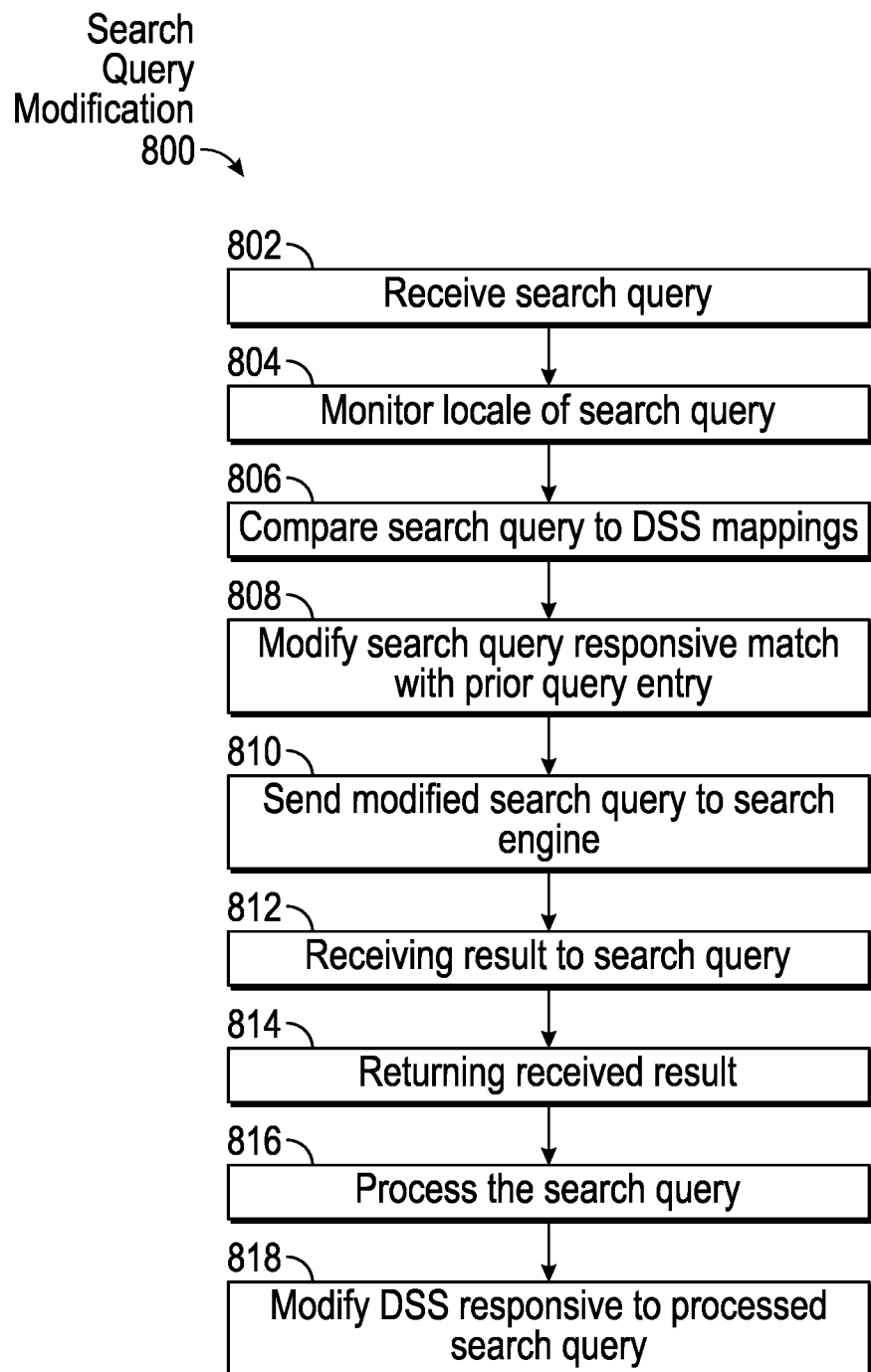

FIGS. 6, 7, and 8 depict flow charts 600/700/800 illustrating example methods for query database generation, dictionary generation, and query modification, respectively. Although the flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of a method may be performed in whole or in part, may be performed in conjunction with some or all of the steps in other methods, and/or may be performed by any number of different systems, such as the systems described in FIGS. 1-5 and 9-11.

FIG. 6 is a flow diagram illustrating an example method 600 for query processing, e.g., using the query processing system 124. Although the below description of the method 600 refers to the query processing system 124, other systems for query processing will be understood from the description herein.

At block 602, the query processing system 124 receives one or more query history logs 302. Query generation system 202 receives the query history logs 302 on a periodic basis (e.g., daily). In an example, the query history logs include queries along with a corresponding user ID, session ID, and locale. The user ID and session ID enables grouping of the subqueries and the identification of an associated target query gathered from streams of queries from multiple users and multiple sessions.

During a search, a user may start typing her query (e.g., "Heart") in a search field of a GUI the application server 104 serves to their client device, interacts with results when the right ones show up and then erases the query to start another search (e.g., "Love"). Table 1 shows a hypothetical search session with two queries ("Heart" and "Love") where each row in the table represents a separate user action in a sequence, such as character addition or deletion.

TABLE 1

H
He
Hea
Hear
Heart
Hear
Hea
He
H

TABLE 1-continued

L
Lo
Lov
Love

In this example, the user intends to search for "Heart" first and then attempts another search for "Love". The query processing system 124 differentiates between target queries (e.g., "Heart" and "Love") and the other queries (referred to herein as subqueries) that led to them. At the end, it creates a mapping between all subqueries and the target query for each target query.

TABLE 2 h -> heart
he -> heart
hea -> heart
hear -> heart
heart -> heart
l -> love
lo -> love
lov -> love
love -> love In one example, differentiation between target queries and subqueries is achieved by partitioning query events by user ID and session ID. An additional constraint such as breaking up sessions by an empty string (" ") may be used to detect multiple searches within a single session. Within each query session, the query processing system 124 identified the longest query by the number of characters as the target query and create a mapping between all subqueries and that target query. Duplicate entries may be removed by applying a dedup algorithm.

At block 604, the query processing system 124 selects useful subqueries for identifying target queries. In one example, search events and corresponding search results are generated after every user keystroke. Subqueries unlikely to provide suitable results are eliminated, e.g., for noise-signal and privacy reasons. The query processing system 124 identifies useful subqueries by computing an empirical estimate of conditional probabilities of all subquery to target query mappings, for example, "hea" and "heart", i.e., P("heart"|"hea"). The probability is compared to a threshold (e.g., of 50%) that promotes a candidate mapping into the next round. In an example, a subquery may also be a target query (e.g., subquery "love"→targe query "love"), which is use for translation.

In one example, the query processing system 124 generates a subset of subqueries to target queries mappings over a period of time (e.g., the last 28 days of search events) with the following criteria:
1. Do not consider queries that resulted in friending related actions (e.g., those entered to identify a specific username or display name friend), which are unlikely to be generally useful to a broad user base.
2. A threshold number of user (e.g., at least 10 unique users) must establish a particular subquery to target query mapping per locale, which is useful for control the size of the matching database.
3. Probability that the user will select the target query X given the subquery Y is greater than a threshold (e.g., at least 50%), which ensures that each X has a single and unique Y in the final mapping.
4. A similarity coefficient (e.g., a Jaccard similarity coefficient) greater than a threshold (e.g., 0.5) to avoid abuse by removing associations that are distant in character space, such as "love"→"hate".

This produces a map of subqueries to target queries where all subqueries are unique and target queries are exactly how they have been entered by users. This is because, the subqueries should match what the users are actually entering. Note that the subqueries often are, but not always, prefix subqueries. In one example, the target queries are corrected and the subqueries are not. For example, the user may wonder around a bit on how they get to the final query (adding and removing characters) and if enough of them visit a particular state, it eventually makes it to the query completion mapping.

At block 606, the query processing system 124 identifies target query misspellings. The query processing system 124 may check the spelling of target queries using a dictionary developed from the query history logs (e.g., using techniques described herein), which includes mappings between correctly spelled target queries and common misspellings. In one example, a target query misspelling is identified when a match with a common misspelling is identified in the dictionary.

The spelling of subqueries may not be checked or corrected as the subqueries represent actual entries of users, which may contain common misspellings and typos useful in selecting intended target entries for others that make those same mistakes. In this example, the query processing system 124 maintains common misspelling patterns in the subquery space (such as "hes" in Table 3), but target queries ideally match the tagging keywords in the index and, therefore, misspellings in those are highly undesirable.

TABLE 3 h
he
hes
he
hea
hear
heart
hear
hea
he
h
l
lo
lov
love

At block 608, the query processing system 124 corrects target query misspellings. The query processing system 124 may correct identified misspelling using the dictionary. For a target query matching a common misspelling in the dictionary, the query processing system augments the target query with a corresponding correctly spelled target query from the dictionary.

At block 610, the query processing system 124 identifies target query matches. After spell correction, the query processing system 124 identifies target query matches and combines matching target queries and their associated subqueries into a single target query.

At block 612, the query processing system 124 identifies unique subqueries. After target query matching, the query processing system 124 removes duplicate subqueries (e.g., by applying a conventional dedup algorithm) such that unique subqueries remain.

At block 614, the query processing system 124 includes the remaining target queries and selected/unique subqueries in a database of the QPL 310.

At block 616, the query processing system 124 identifies emojis. Search queries may include emojis on their own without any additional characters. For example, searches like " 💀 😌 " may be input. In conventional search systems, such searches would not return any meaningful results besides exact matches in tag substrings or usernames. To address such situations, the query processing system 124 converts them to their text versions.

At block 618, the query processing system 124 identifies text associated with the emoji(s). For example, the search " 💀 😌 " could be converted to "face relieved not done hourglass," e.g., by comparing the individual emojis to entries in an emoji database including emojis and corresponding text for each emoji. The query processing system 124 identifies associated text when there is a match in the emoji database.

At block 620, the query processing system 124 includes the associated text in a database of the QPL 310. The query processing system 124 may supplement the emoji(s) with the associated text or may replace the emoji.

At block 622, the query processing system 124 sends target queries to a machine translation engine. In an example, spell-corrected and emoji expanded target queries are sent for translation to English using a third-party translation engine such as Google Translate using Google Translate APIs available from Google of Mountain View, Calif., USA.

At block 624, the query processing system 124 receives the translation (if available) and a corresponding language identifier. In an example, the translation engine returns a translation (if available) along with the detected languages for each query.

At block 626, the query processing system 124 includes the translation in a database of the QPL 310. When an available translation is returned, the query processing system 124 adds the translation into a mapping to the associated target query.

FIG. 7 is a flow diagram illustrating an example method 700 for building a dictionary. The method is language agnostic and automatically detects desired spelling corrections from the data in the query logs. Spell correction may be dynamic, being built on the go relative to the current state of the dictionary at any given time. Although the below description of the method 700 refers to the query processing system 124, other systems for query processing will be understood from the description herein.

At block 702, the query processing system 124 places the target queries in order. In one example, the query processing system 124 orders target queries in decreasing order by their relative frequencies of occurrence in the user queries. For example, the top target queries may be the cake emoji "🎂" followed by the term "heart".

At block 704, the query processing system 124 adds the first target query to the dictionary to start building the dictionary. In an example, the query processing system 124 adds the first most common search term (in full) to the dictionary with a concatenated locale to distinguish the same words in different languages, such as "bald" in English and German.

At block 706, the query processing system 124 selects the next target query. In an example, the query processing system 124 selects the second most common word, followed by the third, etc.

At block 708, the query processing system 124 determines if a spell correction of the next target query is within a predefined edit distance (e.g., an edit distance of one; any different letter in the same position is directly next to the correct letter on a known keyboard such as a qwerty keyboard) for a word already in the dictionary. If the spell correction is within the predefined edit distance, processing proceeds at block 710. Otherwise, processing proceeds at block 714.

At block 710, the query processing system 124 determines if the relative frequency of occurrence is greater than a predefined threshold (e.g., 1.0 percent). This is because it is likely that a misspelled term would occur less frequently than the correct version. If the relative frequency is greater than the predefined threshold, processing proceeds at block 714. Otherwise, processing proceeds at block 712.

At block 712, the query processing system 124 adds the current target query being processed to a correction map. At block 714, the query processing system 124, adds the current target query to the dictionary.

Thus, in blocks 708 and 710, the second most common word is compared with the first most common word in the dictionary being built. If its edit distance is, for example, less than or equal to 1 and its frequency is less than 1% of the first word, the query processing system 124 considers the second word to be a misspelling of the first. It is then replaced as described below everywhere in a target mapping with the correctly spelled version and is not added to the dictionary. The third most common word is then checked against all words added to the dictionary, followed by the fourth, etc.

At each step, if the misspelling is identified, it is fixed in the target mapping, otherwise, it is added to the dictionary with the appropriate frequency count. The dictionary grows as the process is repeated for all queries and produces a language-specific vocabulary that reflects the intended usage of the search platform. It contains, for example, "good morning" and "ttyl", even though these words may not be found in a conventional dictionary.

FIG. 8 is a flow diagram illustrating an example method 800 for query processing, e.g., using the query processing system 124. Although the below description of the method 800 refers to the query processing system 124, other systems for query processing will be understood from the description herein.

At block 802, the query processing system 124 receives the search query. The query processing system 124 receives the search query from a client device 110.

At block 804, the query processing system 124 monitors the locale of the search query. The processing system 124 detects a locale associated with the search query. The client application 114 on the client device 110 may add the locale to the search query, e.g., based on parameters gathered during device set up or gathered from sensors such as GPS sensors.

At block 806, the query processing system 124 compares the search query to mappings in a database of the QPL 310. The query processing system 124 compares the current search query received from the client device 110 to spell correction mapping, translations mappings, expansion mapping, or a combination thereof.

At block 808, the query processing system 124 modifies the search query responsive to a match in the mappings in a database of the QPL 310. The search query may be modified by replacing the search query (e.g., replacing a misspelled word with the correct word) or supplementing the original search query (e.g., adding the English version of a foreign word or adding text associated with an emoji) while retaining the original search query.

At block 810, the query processing system 124 sends the modified search query to the search engine. In an example, the query processing system 124 sends the modified search query to a third-party search engine such as Elasticsearch.

At block 812, the query processing system 124 receives a result for the modified search query from the search engine. In an example, the third-party search engine returns the search results for the modified search query to the query processing system 124.

At block 814, the query processing system 124 returns the received result to the client device. In an example, the query processing system 124 returns the results to the client application 114 for display by the client device 110.

At block 816, the query processing system 124 processes the original search query for use. The query processing system 124 sends the original search query to the search logs for subsequent processing and mapping as described herein.

At block 818, the query processing system 124 modifies the database of the QPL 310 responsive to processed search query.

Figure 9:
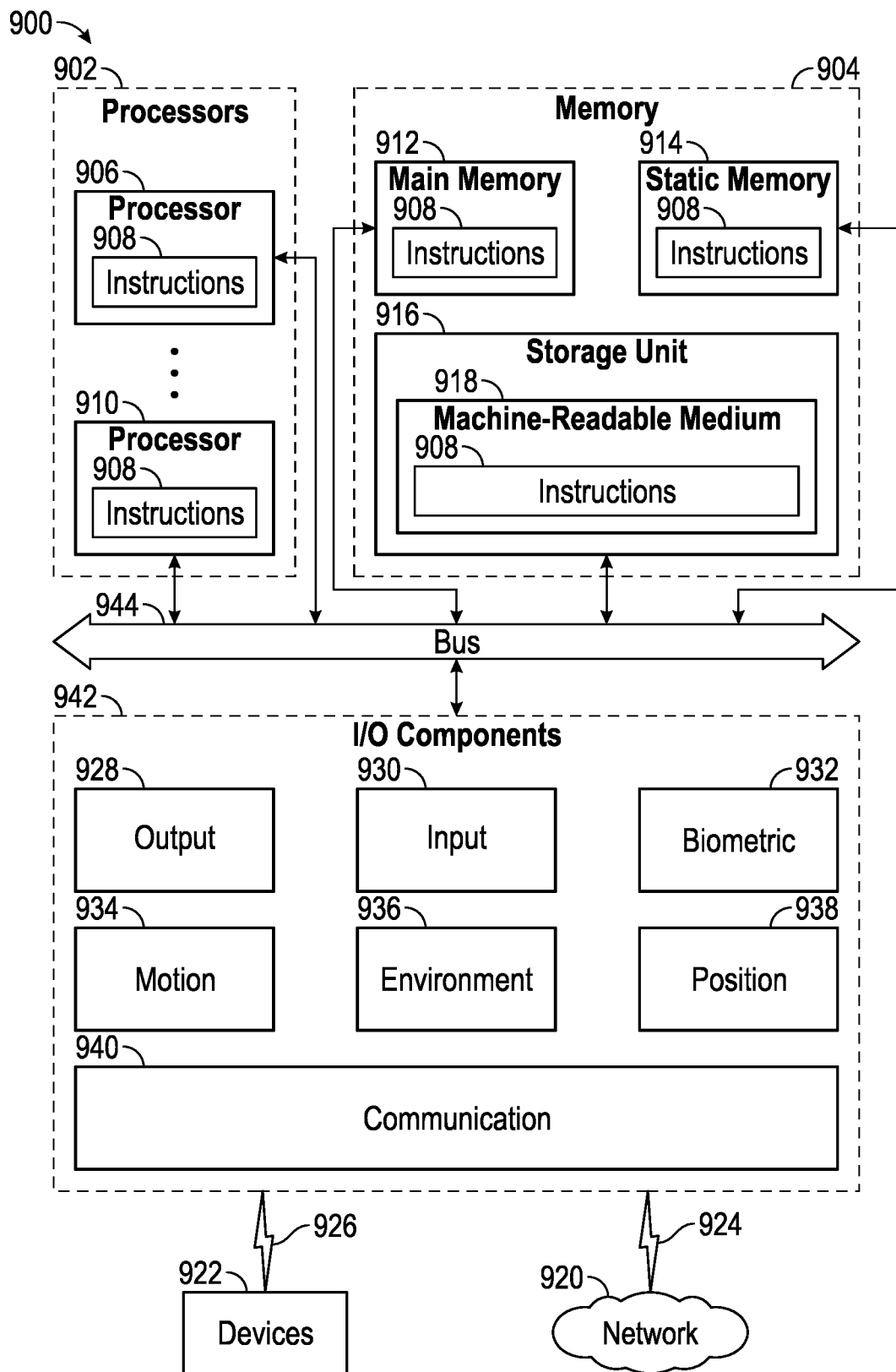
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogrambased identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
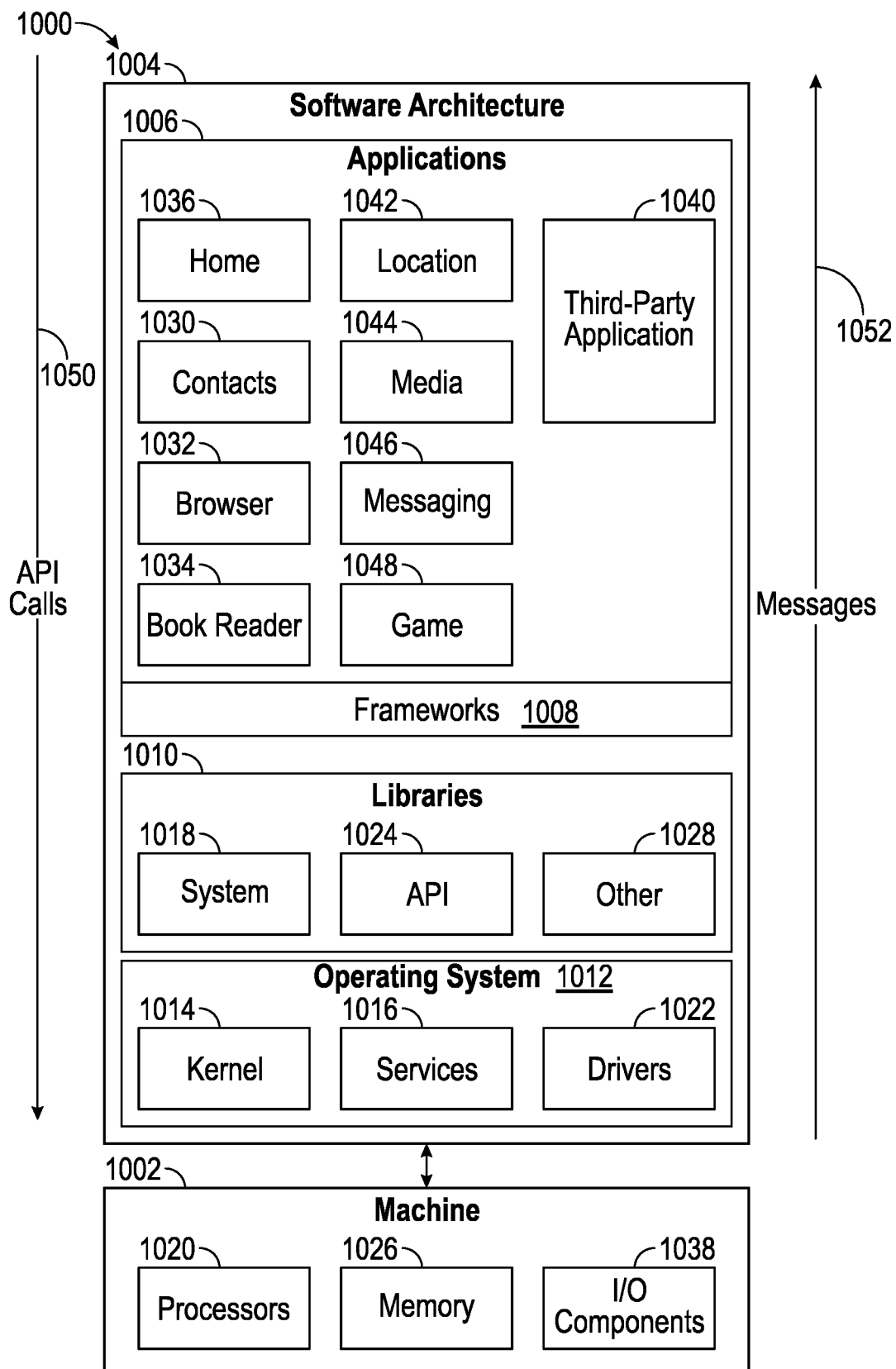
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

FIG. 11A is a GUI 1100 depicting an example search result utilizing query completions. Because it is not easy to type on the mobile keyboard, the QPL 310 (FIG. 3) is proactive in anticipating a user's intended search. When someone types " апе " (just three characters), 63% of the time they will finish with " апельсин " which is an "orange" in Russian. Since " апе " does not really mean anything on its own, it is likely prudent to return results for " апельсин " just after three characters typed.

The GUI 1100 includes a search field 1102 and a results field 1104. In the illustrated example, a user has entered a query 1106 (i.e., "happy b") into the search field 1102, which is sent to the application server 104 (FIG. 1). The QPL 310 (FIG. 3) of the query processing system 124 on the application server 104 includes a matching subquery (i.e., "happy b") that is mapped to a target query (e.g., "happy birthday"). The QPL 310 modifies the query 1106 by replacing or adding the target query before sending to the search engine 312. The search engine 312 returns results 1108 related to the modified search query that the search engine may have otherwise missed if it had only based the search on the original query (i.e., "happy b").

FIG. 11B is a GUI 1120 depicting an example search result utilizing spell correction. Due to small mobile keyboard, there are several persistent misspelling variations of many common words, such as "John," e.g., "Jkhn", "Jlhn" and "Nohn". In all cases, it is the neighboring keys on the keyboard that get replaced. A search engine such as Elasticsearch does not return results for "John" given these misspelled variants of "John," though there is a high probability that that is what a user intended to type. Similarly, mistyping "norning" results in a completely different set of results.

The GUI 1120 includes a search field 1102 and a results field 1104. In the illustrated example, a user has entered a query 1126 (i.e., "good norning") into the search field 1102, which is sent to the application server 104 (FIG. 1). The QPL 310 (FIG. 3) of the query processing system 124 on the application server 104 includes a matching subquery (i.e., "good norning") that is mapped to a target query (e.g., "Good Morning"). The QPL 310 modifies the query 1126 by replacing or adding the target query before sending to the search engine 312. The search engine 312 returns results 1128 related to the modified search query that the search engine may have otherwise missed if it had only based the search on the original query (i.e., "good norning").

FIG. 11C is a GUI 1140 depicting an example search result utilizing query expansion. "Visual" communication in very popular, so it makes sense that users would like to search for content by typing in emojis and potentially other forms of non-text queries. For example, if a user types a " 🐫 " in the search field, the system should return results for the term "camel."

The GUI 1120 includes a search field 1102 and a results field 1104. In the illustrated example, a user has entered a query 1146 (i.e., "🎂") into the search field 1102, which is sent to the application server 104 (FIG. 1). The QPL 310 (FIG. 3) of the query processing system 124 on the application server 104 includes a matching subquery (i.e., "🎂") that is mapped to a target query (e.g., "birthday cake"). The QPL 310 modifies the query 1146 by replacing or adding the target query before sending to the search engine 312. The search engine 312 returns results 1148 related to the modified search query that the search engine may have otherwise missed if it had only based the search on the original query (i.e., "🎂").

FIG. 11D is a GUI 1160 depicting an example search result utilizing query translations. When someone searches for a non-English word such as "corazon," which is "heart" in Spanish, Elasticsearch does not match the English "heart" tags with "corazon". Rather it needs to be explicitly tagged with "corazon" to work. The QPL 310 can address this deficiency.

The GUI 1120 includes a search field 1102 and a results field 1104. In the illustrated example, a user has entered a query 1166 (i.e., "ap6y3") into the search field 1102, which is sent to the application server 104 (FIG. 1) along with locale (i.e., "RU"). The QPL 310 (FIG. 3) of the query processing system 124 on the application server 104 includes a matching subquery (i.e., "ap6y3") that is mapped to a target query (e.g., "Watermelon"). The QPL 310 modifies the query 1166 by replacing or adding the target query before sending to the search engine 312. The search engine 312 returns results 1168 related to the modified search query that the search engine may have otherwise missed if it had only based the search on the original query (i.e., "ap6y3").

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g., approximate, substantially, or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method of assembling a database for query generation, the method comprising:
   creating a query history log by receiving a data stream including query events within query sessions, each query session including a character string, each query event including a user identifier and a session identifier and partitioning the query events by user identifier and session identifier, the query history log including target queries and a mapping between each of the target queries and associated subqueries for each of the target queries;
   selecting one or more of the associated subqueries for a first target query based on a conditional probability exceeding a threshold for the associated subqueries of the first target query compared to matching associated subqueries of the other target queries;
   including the first target query and the selected one or more associated subqueries for the first target query in an in-memory data structure store for query generation;
   selecting one or more of the associated subqueries for a second target query based on a conditional probability exceeding a threshold for the associated subqueries of the second target query compared to the matching associated subqueries of other target queries;
   identifying misspelling of the second target query by ordering the target queries by decreasing frequency from a most frequent target query to a least frequent target query, building a dictionary by processing the order target queries starting with the most frequent target query as follows:
   i. adding a first frequency ordered target query to a dictionary;
   ii. adding a second frequency ordered target query to the dictionary if the second frequency ordered target query does not include one or more spell corrections within a pre-specified edit distance with respect to the first frequency ordered target query or has a relative frequency with respect to the first frequency ordered target query that exceeding a threshold; and
   iii. repeating step ii with a next most frequent frequency ordered target query until the least frequent target query is reached; and
   correcting the misspelling of the second target query.

2. The method of claim 1, further comprising:
   including the second target query as corrected and the selected one or more associated subqueries for the second target query in the in-memory data structure store for query generation.

3. The method of claim 1, wherein misspellings are not identified or corrected for the selected associated subqueries of the second target query.

4. The method of claim 1, further comprising:
   identifying a match between the first target query and the corrected second target query; and
   identifying unique subqueries in the associated subqueries of the second target query not matching any of the associated subqueries of the first target query;
   wherein the including further comprises associating the identified unique subqueries with the first target query in the in-memory data structure store for query generation.

5. The method of claim 1, further comprising:
   adding the first frequency ordered target query and the second frequency ordered target query to a correction map if the second frequency ordered target query includes one or more spell corrections within the pre-specified edit distance with respect to the first frequency ordered target query and the relative frequency with respect to the first frequency ordered target query does not exceed the threshold;
   wherein the identifying the misspelling of the second target query comprises comparing the second target query to the correction map to identify a match.

6. The method of claim 1, wherein the selecting is further based on at least one of:
   a number of unique users entering a particular one of the associated subqueries for the first target query exceeding a user threshold number;
   a similarity coefficient greater than a percentage threshold; or
   subqueries that resulted in friending related actions.

7. The method of claim 1, further comprising:
   identifying an emoji in the first target query;
   identifying text corresponding to the emoji; and
   associating the text with the first target query in the in-memory data structure store.

8. The method of claim 1, further comprising:
   sending the first target query to a machine translation system;
   receiving from the machine translation system for the first target query a translation and a corresponding translation language identifier; and
   associating the translation with the first target query in the in-memory data structure store.

9. The method of claim 1, wherein a query from the query history log having the longest string of characters is designated as the target query.

10. The method of claim 1, further comprising the steps of:
    separating the query sessions responsive to an empty character string within the character string of the query session.

11. A query generation system for assembling a database for query generation, the system comprising:
    a receiving port that receives a query history log, the query history log including target queries and a mapping between each of the target queries and associated subqueries for each of the target queries;
    a selection engine that selects one or more of the associated subqueries for a first target query based on a conditional probability exceeding a threshold for the associated subqueries of the first target query compared to matching associated subqueries of the other target queries and selects one or more of the associated subqueries for a second target query based on a conditional probability exceeding a threshold for the associated subqueries of the second target query compared to the matching associated subqueries of the other target queries;
a generation engine that stores the first target query and the selected one or more associated subqueries for the first target query in an in-memory data structure store for query generation;
a spelling module that identifies misspelling of the second target query wherein the spelling module orders the target queries by decreasing frequency from a most frequent target query to a least frequent target query and builds a dictionary by processing the ordered target queries starting with the most frequent target query by (i) adding a first frequency ordered target query to a dictionary, (ii) adding a second frequency ordered target query to the dictionary if the second frequency ordered target query does not include one or more spell corrections within a pre-specified edit distance with respect to the first frequency ordered target query or has a relative frequency with respect to the first frequency ordered target query that exceeding a threshold, and (iii) repeating step ii with a next most frequent frequency ordered target query until the least frequent target query is reached; and
a correction module that corrects the misspelling of the second target query.

12. The system of claim 11, further comprising:
a match identification module that identifies a match between the first target query and the corrected second target query; and
a subquery identification module that identifies unique subqueries in the associated subqueries of the second target query not matching any of the associated subqueries of the first target query;
wherein the generation engine associates the identified unique subqueries with the first target query in the in-memory data structure store for query generation.

13. The system of claim 11, further comprising:
an emoji identification engine that identifies an emoji in the first target query; and
a text identification engine that identifies text corresponding to the emoji;
wherein the generation engine associates the text with the first target query in the in-memory data structure store.

14. The system of claim 11, further comprising:
a query log generation engine that creates the query history log by receiving a data stream including query events within query sessions, each query session including a character string, each query event including a user identifier and a session identifier and partitioning the query events by user identifier and session identifier.

15. A non-transitory processor-readable storage medium storing processor-executable instructions that, when executed by a processor of a machine, cause the machine to perform operations comprising:
creating a query history log by receiving a data stream including query events within query sessions, each query session including a character string, each query event including a user identifier and a session identifier and partitioning the query events by user identifier and session identifier, the query history log including target queries and a mapping between each of the target queries and associated subqueries for each of the target queries;
selecting one or more of the associated subqueries for a first target query based on a conditional probability exceeding a threshold for the associated subqueries of the first target query compared to matching associated subqueries of the other target queries;
including the first target query and the selected one or more associated subqueries for the first target query in a database for query generation;
selecting one or more of the associated subqueries for a second target query based on a conditional probability exceeding a threshold for the associated subqueries of the second target query compared to the matching associated subqueries of the other target queries;
identifying misspelling of the second target query by ordering the target queries by decreasing frequency from a most frequent target query to a least frequent target query, building a dictionary by processing the ordered target queries starting with a most frequent target query as follows:
i. adding a first frequency ordered target query to a dictionary;
ii. adding a second frequency ordered target query to the dictionary if the second frequency ordered target query does not include one or more spell corrections within a pre-specified edit distance with respect to the first frequency ordered target query or has a relative frequency with respect to the first frequency ordered target query that exceeding a threshold; and
iii. repeating step ii with a next most frequent frequency ordered target query until the least frequent target query is reached; and
correcting the misspelling of the second target query.

16. The non-transitory processor-readable storage medium of claim 15, wherein the processor-executable instructions, when executed by the processor, further cause the machine to perform operations comprising:
including the second target query as corrected and the selected one or more associated subqueries for the second target query in an in-memory data structure store for query generation.

17. The non-transitory processor-readable storage medium of claim 15, wherein the processor-executable instructions, when executed by the processor, further cause the machine to perform operations comprising:
adding the first frequency ordered target query and the second frequency ordered target query to a correction map if the second frequency ordered target query includes one or more spell corrections within the pre-specified edit distance with respect to the first frequency ordered target query and the relative frequency with respect to the first frequency ordered target query does not exceed the threshold;
wherein the identifying the misspelling of the second target query comprises comparing the second target query to the correction map to identify a match.

18. The non-transitory processor-readable storage medium of claim 15, wherein the selecting is further based on at least one of:
a number of unique users entering a particular one of the associated subqueries for the first target query exceeding a user threshold number;
a similarity coefficient greater than a percentage threshold; or
subqueries that resulted in friending related actions.

19. The non-transitory processor-readable storage medium of claim 15, wherein the processor-executable instructions, when executed by the processor, further cause the machine to perform operations comprising:
identifying an emoji in the first target query;
identifying text corresponding to the emoji; and
associating the text with the first target query in an in-memory data structure store.

20. The non-transitory processor-readable storage medium of claim 15, wherein the processor-executable instructions, when executed by the processor, further cause the machine to perform operations comprising:
sending the first target query to a machine translation system;
receiving from the machine translation system for the first target query a translation and a corresponding translation language identifier; and
associating the translation with the first target query in an in-memory data structure store.

* * * * *